(No Model.) 2 Sheets—Sheet 1.

M. GROLLIMUND.
GRAIN CLEANING AND SEPARATING MILL.

No. 373,066. Patented Nov. 15, 1887.

Witnesses:
T. R. Stuart
L. Seward Bacon

Inventor:
Moritz Grollimund

By Emmarble
Atty.

(No Model.) 2 Sheets—Sheet 2.

M. GROLLIMUND.
GRAIN CLEANING AND SEPARATING MILL.

No. 373,066. Patented Nov. 15, 1887.

Witnesses:
J. K. Stuart.
L. Seward Bacon

Inventor:
Moritz Grollimund
By
Atty.

N. PETERS, Photo-Lithographer, Washington, D. C.

UNITED STATES PATENT OFFICE.

MORITZ GROLLIMUND, OF FERGUS FALLS, MINNESOTA.

GRAIN CLEANING AND SEPARATING MILL.

SPECIFICATION forming part of Letters Patent No. 373,066, dated November 15, 1887.

Application filed March 4, 1887. Serial No. 229,707. (No model.)

*To all whom it may concern:*

Be it known that I, MORITZ GROLLIMUND, a citizen of the United States, residing at Fergus Falls, in the county of Otter Tail and State of Minnesota, have invented certain new and useful Improvements in Grain Cleaning and Separating Mills; and I do hereby declare the following to be a full, clear, and exact description of the invention, such as will enable others skilled in the art to which it appertains to make and use the same.

My invention relates to an improvement in fanning-mills for separating and cleaning grain; and it consists in the construction and arrangement or combination of the parts thereof, which will be more fully hereinafter described, and definitely pointed out in the claim.

My invention is illustrated in the accompanying drawings, wherein the same letters of reference indicate the same or corresponding parts in the several views, and in which—

Figure 1:
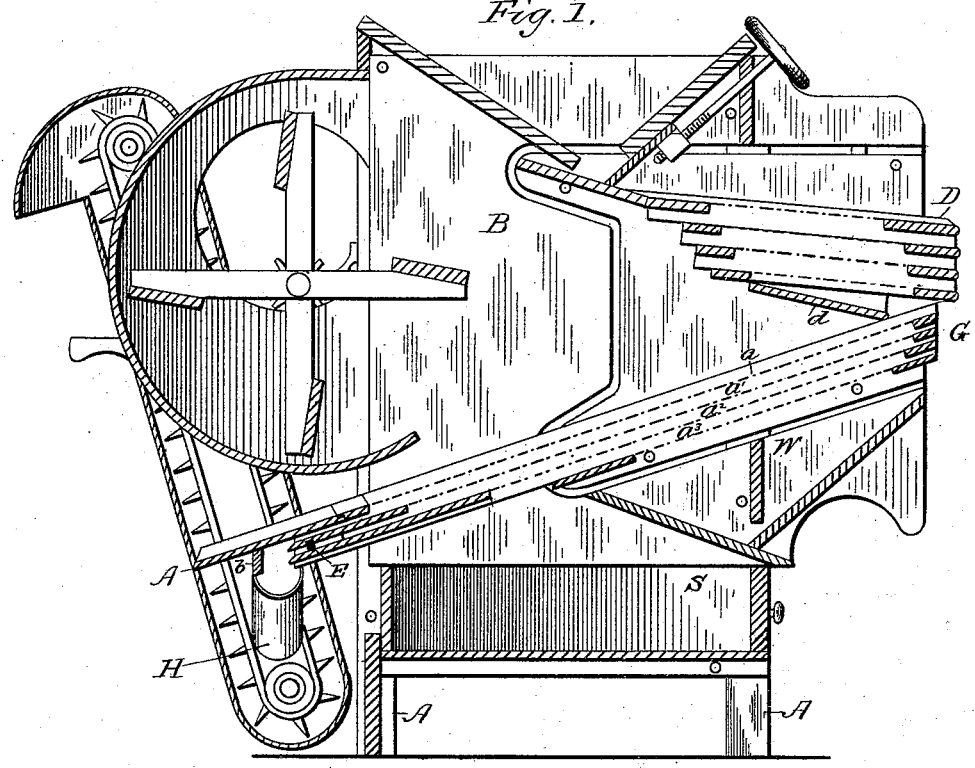
Figure 2:
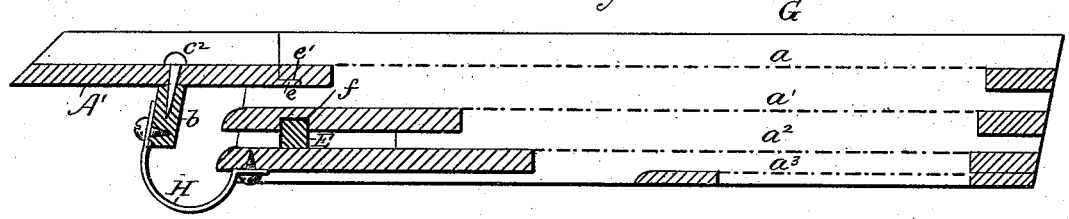
Figure 3:
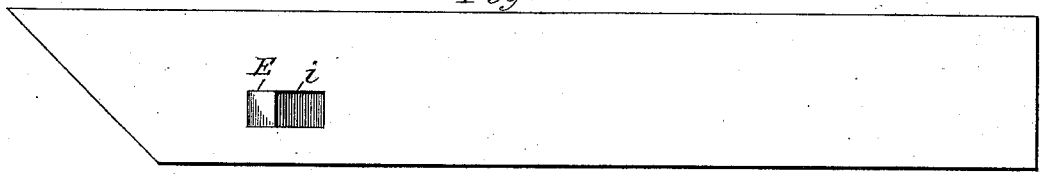
Figure 4:
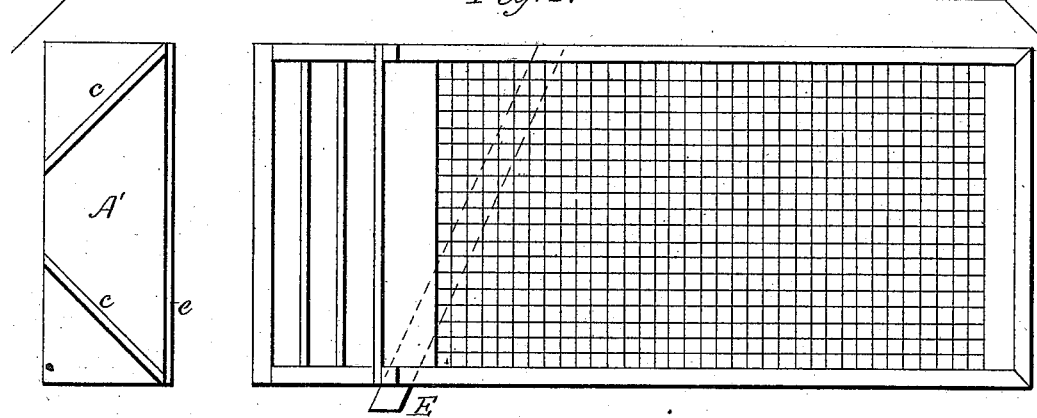
Figure 5:
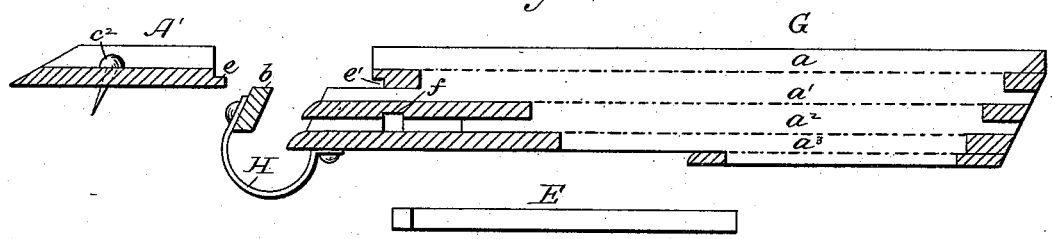

Figure 1 is a longitudinal vertical section of my improved mill. Fig. 2 is a detail view in sectional elevation of the lower gang of sieves, showing my improved cut-off connected thereto. Fig. 3 is a detail view in side elevation of the shoe of the lower gang of sieves, showing the grain-exit opening. Fig. 4 is a top plan view of the lower gang of sieves and the spout, the said spout being illustrated as detached, and also showing the diagonal position of the removable cross-piece. Fig. 5 is a detail view in sectional side elevation of the lower gang of sieves, showing the detachable separating devices removed.

In the drawings, A represents the framework, and B the sides, of a mill of ordinary construction, having a suitable fan and elevator, arranged in a manner well known in the art, and a hopper situated in the upper part thereof, having a suitable opening in its bottom portion.

D is a gang of sieves situated in the upper front part of the mill, upon which the contents of the hopper are delivered, which, after being freed from the chaff and other foreign matter by the vibration of the sieves and the blast from the fan, are again delivered upon the inclined chute $d$, and from thence upon the upper sieve of the lower gang of sieves, G. This lower gang of sieves, G, extends the entire length of the lower portion of the mill and inclines downward toward the rear thereof, as shown, and is vibrated laterally or longitudinally, as may be desired, by well-known means.

I employ a series of four sieves, $a$, $a'$, $a^2$, and $a^3$, in this lower gang, G, the meshes of which gradually diminish in size from the upper to the lower one. These sieves are of an unequal length, the top sieve, $a$, being of greater length than the lower ones, $a'$, $a^2$, and $a^3$, each one of which is somewhat shorter than the one directly above it, as shown in Fig. 1.

On the lower end of the sieve $a$ a detachable spout, A', is mounted, extending out beyond the mill and provided with suitable cleats, $c$ $c$, placed diagonally thereon to concentrate the flow of grain from the sieve $a$. This spout A' has a tongue, $e$, on one end, as shown, which fits in a groove, $e'$, in the end of the frame of the sieve $a$, thereby forming a close joint. The spout A' is held in position and prevented from slipping, and thereby becoming detached, by a pin, $c^2$, extending down through the same at or about its central portion into the supporting-bar $b$, where it is loosely held, thus allowing an easy withdrawal of the same and the removal of the spout.

The lower end bars of the frame of sieves $a'$ and $a^2$ are made of different lengths, that of sieve $a^2$ being somewhat longer than $a'$, thereby carrying the frames out flush with each other and beyond the end of the mill, as shown in Fig. 1.

On the under surface of the end bar of sieve $a'$ a groove, $f$, is cut, running diagonally crosswise of the same, in which a cross-piece, E, is adapted to be inserted, the under side of which rests on the upper surface of the end bar of the frame of sieve $a^2$. The lower end of this cross-piece E extends somewhat beyond the sides of the sieves through an elongated opening, $i$, cut in the side of the shoe of the sieve and opening into the space between the sieves $a'$ and $a^2$, for a purpose which will be more fully hereinafter described. The sieve $a^3$ is situated directly under the receiving end portions of the upper sieves, $a$, $a'$, and $a^2$, and extends about midway the length thereof.

Situated directly beneath the sieve $a^3$ is a bin, W, in which the seed that falls through the said sieve is deposited.

S is a receptacle situated in the bottom of the mill, in which the seeds and broken grain that fall over the end of sieve $a^3$ are deposited.

Rigidly secured to the frame-work of the rear part of the mill, and directly under the lower end of sieves $a'$ and $a^2$, is an inclined trough, H, in which the grain that falls over the ends of said sieves is deposited, and thence conducted down the same to the elevator in the rear of the mill. When the mixed grain and seed is delivered from the hopper upon the gang of sieves D, it comes in contact with the blast from the fan and is relieved from all of the chaff and other foreign substance, and is then shaken down through the meshes of the sieve upon the chute $d$, which directs it to the upper end portion of the sieve $a$ of the lower gang of sieves, G, which, being rapidly vibrated, quickly shakes the cleaned grain down the face of the same, retaining the larger seed and allowing the smaller to fall through upon the sieves below, the meshes of the different sieves being so arranged as to cause a perfect separation of the different sizes of the seed, and thereby the different grades of grain.

Large well-filled grain, or first grade, that remains on the sieve $a$ is shaken down the face of the same upon the spout A' at its lower end, and thence into a suitable receptacle, while the somewhat smaller seed, or second grade, is deposited on the sieve $a'$, and thence down the face of the same into the trough H, which, being inclined, carries it to the elevator, which in turn delivers it into a bag attached thereto. The shrunken grain, or third grade, that falls through the sieves above is received on the sieve $a^2$ and is carried down the same until it reaches the cross-piece E, which, being placed diagonally thereon, leads it down to the side of the sieve, through the opening $i$ in the side of the shoe, into a suitable receptacle situated on the outside of the mill.

The grass-seed which may have been carried down and deposited on the lower sieve of the gang G, being much smaller than the grain, immediately falls through the sieves into the bin W, and is there collected, while the cockle or other small foreign seeds and broken grain which fall through the sieves $a$, $a'$, and $a^2$ upon the lower sieve, $a^3$, are carried down the same and fall into the receptacle S, this class being generally known as "chicken-feed." It will thus be seen that I am enabled to secure a perfect separation of the grain and seed into what is generally known as "first," "second," and "third" grades, chicken-feed, and grass-seed.

If at any time it be desired to mix the first and second grades, it is only necessary to remove the spout A', and the first grade will fall into the trough H with the second, thus mixing the two grades; and still further, if it be desired to mix the third grade with the first and second, or with the second alone, the cross-piece E is removed, allowing the grain on the sieve $a^2$ to flow down into the trough H with the other grades from the sieves above, thus accomplishing a quick and easy mixing or separating of the grain.

It is obvious that many minor changes in the construction and arrangement of the parts of my improved mill could be made and substituted for those shown and described without in the least departing from the nature and principle of my invention.

Having thus described my invention, what I claim as new, and desire to secure by Letters Patent, is—

The combination of a shoe having an opening, $i$, in one side, a series of sieves, $a$ $a'$ $a^2$, one above another, in said shoe, a spout, H, secured at the lower end of said sieves and adapted to receive the tailings from all of them, a removable spout, A', at the lower end of the uppermost of said sieves and projecting over said spout H, and a removable cross-piece, E, adapted to be diagonally inserted between two of the lower sieves, substantially as set forth.

In testimony whereof I affix my signature in presence of two witnesses.

MORITZ GROLLIMUND.

Witnesses:
J. G. WURTELE,
EDDIE S. ANDERSON.